(12) United States Patent
Lim et al.

(10) Patent No.: US 8,335,278 B2
(45) Date of Patent: Dec. 18, 2012

(54) METHOD FOR TRANSMITTING COMMON FEEDBACK CHANNEL AND TRANSCEIVER THEREFOR

(75) Inventors: Kwang Jae Lim, Daejeon (KR); Chul Sik Yoon, Seoul (KR); Young-Ho Jung, Goyang-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 455 days.

(21) Appl. No.: 12/608,678

(22) Filed: Oct. 29, 2009

(65) Prior Publication Data

US 2010/0111224 A1    May 6, 2010

(30) Foreign Application Priority Data

Nov. 4, 2008  (KR) .................. 10-2008-0108944
Sep. 1, 2009  (KR) .................. 10-2009-0082081

(51) Int. Cl.
*H04L 25/49* (2006.01)
(52) U.S. Cl. ........ 375/296; 375/260; 375/295; 375/259; 375/285; 375/219; 375/221; 455/126; 455/114.2
(58) Field of Classification Search .................. 375/260, 375/296, 295, 259, 285, 219, 221; 455/126, 455/114.2
See application file for complete search history.

(56) References Cited

U.S. PATENT DOCUMENTS

| 7,974,177 B2* | 7/2011 | Ofuji et al. ................ 370/203 |
| 8,031,688 B2* | 10/2011 | Papasakellariou et al. ... 370/344 |
| 2005/0129058 A1 | 6/2005 | Casaccia et al. |
| 2005/0201270 A1 | 9/2005 | Song et al. |
| 2008/0267273 A1 | 10/2008 | Aue |
| 2008/0310389 A1* | 12/2008 | Suzuki et al. ................ 370/346 |

FOREIGN PATENT DOCUMENTS

| KR | 10-2006-0086371 | 7/2006 |
| KR | 10-2006-0135465 | 12/2006 |
| KR | 10-0798968 | 1/2008 |
| KR | 10-2008-0018148 | 2/2008 |
| WO | 2006/137720 | 12/2006 |
| WO | 2008/023945 | 2/2008 |

OTHER PUBLICATIONS

"Shared HARQ feedback channel for E-MBS," Hyun Lee, et al., IEEE C802.16m-09/1808, Aug. 30, 2009, pp. 1-5.

* cited by examiner

*Primary Examiner* — Siu Lee
(74) *Attorney, Agent, or Firm* — Staas & Halsey LLP

(57) ABSTRACT

Disclosed is a method for generating feedback signal patterns of common feedback channels using cyclic shift in a multiple access system, and a transceiver therefore. A method for generating feedback signal patterns includes generating first transmission symbols by adding a cyclic prefix to transmission symbols of feedback signals, and generating second and subsequent transmission symbols by cyclically shifting the first transmission symbols and then adding the cyclic prefix.

9 Claims, 9 Drawing Sheets

3 symbols x 2 subcarriers 2 symbols x 4 subcarriers

METHOD FOR TRANSMITTING COMMON FEEDBACK CHANNEL AND TRANSCEIVER THEREFOR

CROSS-REFERENCE TO RELATED APPLICATION

This application claims priority to and the benefit of Korean Patent Application Nos. 10-2008-0108944 and 10-2009-0082081 filed in the Korean Intellectual Property Office on Nov. 4, 2008 and Sep. 1, 2009, the entire contents of which are incorporated herein by reference.

BACKGROUND OF THE INVENTION (a) Field of the Invention

An exemplary embodiment of the present invention relates to a method for generating feedback signal patterns of common feedback channels using a cyclic shift in a multiple access system and transmitting them to another party, and a transceiver therefore.

(b) Description of the Related Art

A current mobile communication system adopts a hybrid automatic retransmit request (HARQ) technology that changes a transmission scheme according to a state of a channel and a link adaptation technology of such adaptive modulation, etc., to obtain an additional performance gain.

In order to use the link adaptation technology, success or failure of decoding of data received from a receiver to a transmitter, channel state information, etc., should be fed back. In the case of unicast communication that transmits transmission packets to only one receiver, dedicated feedback channels should be allocated to each receiver. Since the transmitters and the receivers are each synchronized with each other, little inter-symbol interference or inter-subcarrier interference occurs even though receiving response signals to feedback signals are out of a cyclic prefix (CP) interval in the multiple access system using a plurality of subcarriers.

In the case of multicast communication that simultaneously transmits one packet to a plurality of receivers, only information on the worst channel state in all the groups receiving the same packets is needed. As a result, instead of an individual feedback allocation scheme that produces an excess feedback burden, a common feedback scheme, which shares the same physical resources and simultaneously transmits the feedback signals by several terminals, is considered.

As one example, a hybrid automatic retransmission request (HARQ) ACK/NACK common feedback scheme for multicast data will be described below. Herein, a base station is considered to be a transmitter and a terminal is considered to be a receiver.

The terminal receiving data transmits ACK (receive success) or NACK (receive failure) signals through the common feedback channels shared for the multicast groups in order to notify the base station of the success or failure of receipt. At this time, when the ACK or NACK signals are transmitted in general signal patterns, all the terminals sharing feedback resources are synchronized with each other such that if all the transmitted signals are received in the cyclic prefix, the inter-symbol interference or the inter-subcarrier interference does not occur. However, when there are some terminals that are not synchronized with each other, the occurrence of the interference cannot be excluded.

FIG. 1 shows an example of transmission signal configuration in common feedback channels according to a scheme of the related art.

As one example, when there is out-of-synchronization between the base station and the terminal, the case where the terminal is in an idle mode can be considered. In other words, when the terminal in the idle mode receives multicast services, the corresponding terminal does not maintain the uplink synchronization with the base station. Therefore, when the terminal transmits the feedback signals in the common feedback channels, the receive timing may deviate from the original receive timing. As shown in FIG. 1, when the time difference is out of the cyclic prefix, the inter-symbol interference and the inter-subcarrier interference occurs such that the receiving performance is degraded.

The above information disclosed in this Background section is only for enhancement of understanding of the background of the invention and therefore it may contain information that does not form the prior art that is already known in this country to a person of ordinary skill in the art.

SUMMARY OF THE INVENTION

To solve the above problems, the present invention has been made in an effort to provide a signal configuring method according to an exemplary embodiment of the present invention having advantages of excellent receive performance even when there is a time delay of more than a cyclic prefix in feedback channels commonly used in terminals belonging to the same multicast services.

An embodiment of the present invention provides a method for transmitting feedback signals by transmitters in a multiple access system, the method including: generating first transmission symbols by adding a cyclic prefix to transmission symbols of the feedback signals; generating second and subsequent transmission symbols by cyclically shifting the first transmission symbols and then adding the cyclic prefix; and transmitting the generated transmission symbols to common feedback channels of an uplink.

Herein, the cyclic shift includes: dividing remaining portions other than the cyclic prefix in the transmission symbols prior to the cyclic shift in a plurality of blocks having a predetermined length; shifting the transmission symbols by one block in one direction; and moving last blocks of the shifted transmission symbol to a front of the corresponding transmission symbol.

The length of the block may be set to be same as the length of the cyclic prefix, and the cyclic prefix may be added in a scheme of copying the last block of the corresponding transmission symbol to the front of the corresponding transmission symbol.

Another embodiment of the present invention provides a transmitter for transmitting feedback signals in a multiple access system, the transmitter including: a feedback pattern generator that cyclically shifts transmission symbols of the feedback signals to generate feedback patterns; a cyclic prefix adder that adds the cyclic prefix to the generated feedback patterns; and transmit circuitry that transmits the feedback patterns to which the cyclic prefix is added to the common feedback channels. The transmitter may further include a feedback controller that determines whether or not to perform feedback on signals received from another party, and if it is determined that the feedback is needed, it requests the generation of the feedback pattern to the feedback pattern generator.

Herein, the feedback pattern generator generates the cyclic prefix to the transmission symbols of the feedback signals to generate first transmission symbols, and cyclically shifts the first transmission symbols and than adds the cyclic prefix thereto to generate second and subsequent transmission symbols.

The feedback pattern generator divides the remaining portions other than the cyclic prefix in the transmission symbols prior to the cyclic shift into a plurality of blocks having a predetermined length, shifts the transmission symbols by one block in one direction, and then moves a last block of the shifted transmission symbol to a front of the corresponding transmission symbol, thereby performing the cyclic shift.

Further, the feedback pattern generator generates the same feedback signal patterns for each cell, wherein it may generate the feedback signal patterns for each cell in a scheme of scrambling the feedback signal patterns with different scramble codes for each cell, and it may generate the feedback signal patterns for each cell at one time using a previously prepared algorithm.

When the present invention shares the same physical resources in the same OFDMA-based communication system to simultaneously transmit the feedback information by several terminals, it can minimize the inter-symbol interference and the inter-subcarrier interference that can occur due to the difference in the receive timing of the signals fed back from each terminal.

DETAILED DESCRIPTION OF THE EMBODIMENTS

Figure 1:
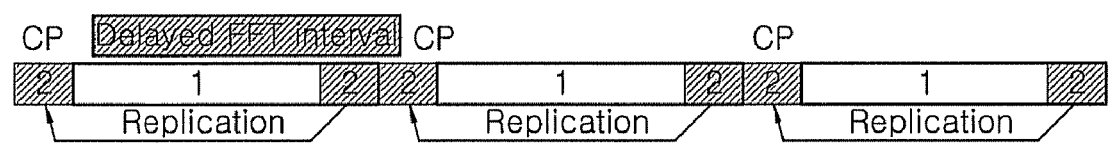
FIG. 1 is a diagram showing an example of a transmission signal configuration in common feedback channels according to a scheme of the related art.

In the following detailed description, only certain exemplary embodiments of the present invention have been shown and described, simply by way of illustration. Accordingly, the drawings and description are to be regarded as illustrative in nature and not restrictive. Like reference numerals designate like elements throughout the specification.

Generally, a communication system includes a transmitter and a receiver. Herein, the transmitter and the receiver may be referred to as a transceiver that performs both transmission function and receiving function. However, in order to elucidate the feedback, one that plays a role of transmitting feedback data is referred to as a transmitter and the other that plays a role of transmitting general data to the transmitter is referred to as a receiver.

In the specification, a feedback signal is collectively referred to as signals that reports signals that are received from another party by a terminal or a base station, to the other party, may include, for example, channel quality information (CQI), channel state information (e.g., SINR (signal to interference-and-noise ratio), SNR (signal-to-noise ratio), etc.), a precoding matrix index (PMI), an ACK/NACK response message according to HARQ retransmission, etc.

An exemplary embodiment of the present invention may be used for various multi-carrier communication systems. As one example of multi-carrier communication, orthogonal frequency division multiplexing (OFDM) partitions the entire system bandwidth into a plurality of subcarriers having orthogonality, and configures one symbol that is a set of a predetermined number of subcarriers in a viewpoint of a frequency.

An exemplary embodiment of the present invention relates to a method for transmitting common feedback channels that do not cause inter-symbol interference or interference between adjacent subcarriers even though there is a time offset that is out of a cyclic prefix at the time of receiving the feedback signals, and an apparatus thereof.

Transmission Patterns in Common Feedback Channels

Figure 2:
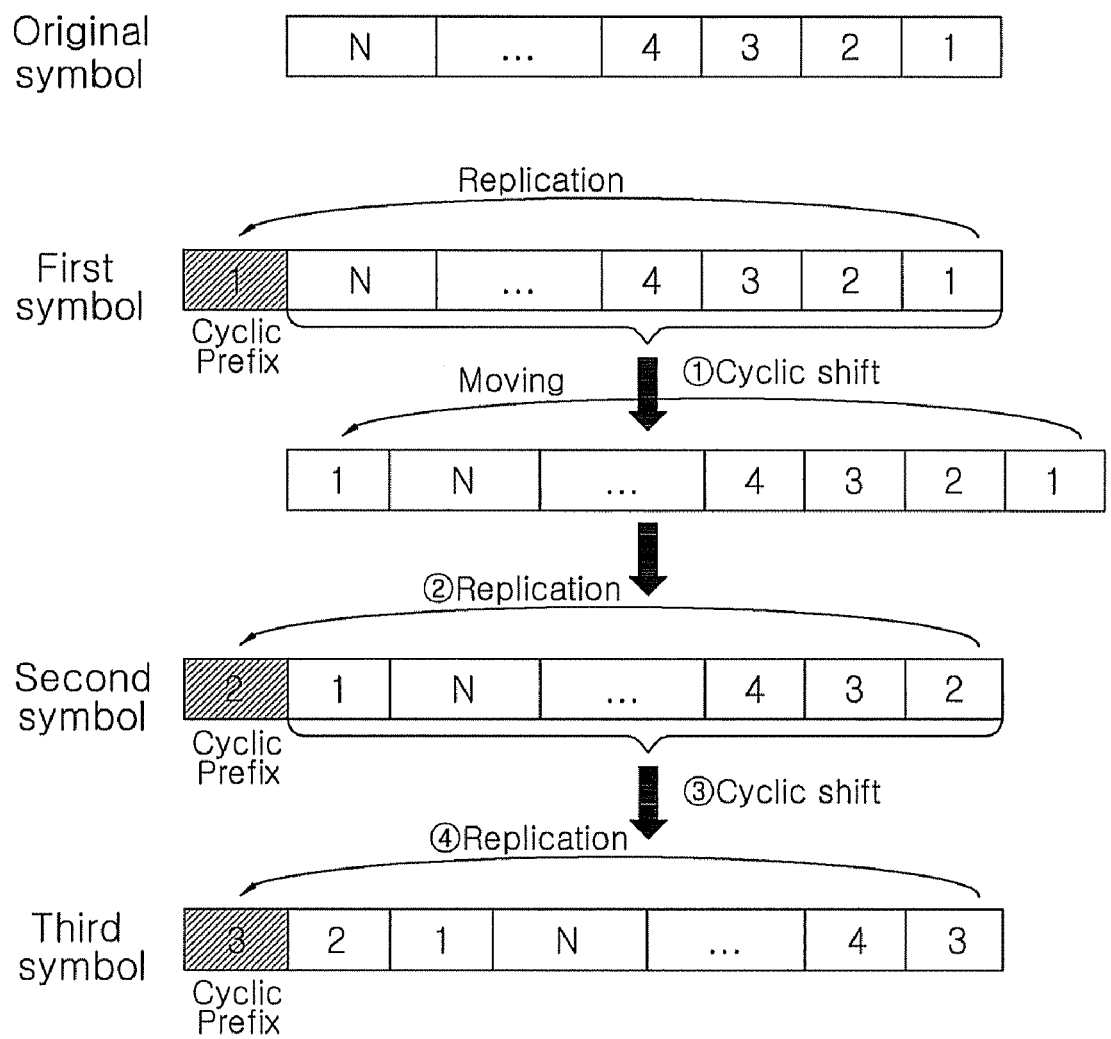
FIG. 2 is a diagram showing transmission patterns in common feedback channels according to an exemplary embodiment of the present invention.

FIG. 2 is a diagram showing the transmission patterns in the common feedback channels according to an exemplary embodiment of the present invention.

In a multicast environment, even though a delay that is out of the cyclic prefix occurs in the receiver due to the asynchronization between the transmitter and the receiver, the feedback signals viewed in a time domain should have continuous repeat characteristics to maintain the orthogonality between the subcarriers after fast Fourier transform is performed in the receiver and to not cause the interference between adjacent symbols.

An exemplary embodiment of the present invention gives the repeat characteristics to the feedback signals through the replication of the cyclic shift and the cyclic prefix. The detailed description thereof is as follows.

As shown in FIG. 2, an exemplary embodiment of the present invention divides the feedback signal patterns of an original symbol into a plurality of blocks corresponding to a size of a cyclic prefix (CP).

A first symbol transmitted in the common feedback channel is generated by replicating a signal sample of a back portion (No. 1 block in the original sample of FIG. 2) corresponding to a size of the cyclic prefix (CP) to a front of the OFDM symbol.

A second symbol is generated by eliminating the cyclic prefix (CP) portion (No. 1 block at the front of the first symbol of FIG. 2) in the first symbol and moving the signal sample of the back portion (No. 1 block at the back of the first symbol of FIG. 2) corresponding to the size of the cyclic prefix (CP) to the front of the CP eliminated first symbol. This is referred to as a cyclic shift.

After the cyclic shift, the signal sample of the back portion (No. 2 block at the back of the second symbol of FIG. 2) corresponding to the size of the cyclic prefix (CP) is replicated to the front of the cyclically shifted symbol as a new cyclic prefix.

A process of generating the second symbol is repeated for a third symbol.

In other words, for the cyclic shift, the cyclic prefix of the second symbol (No. 2 block at the front of the second symbol of FIG. 2) is eliminated and the signal sample of the back portion (No. 2 block at the back of the second symbol of FIG. 2) corresponding to the size of the cyclic prefix (CP) moves to the front of the CP eliminated second symbol. After the cyclic shift, the signal sample of the back portion (No. 3 block at the back of the third symbol of FIG. 2) corresponding to the size of the cyclic prefix (CP) is replicated to the front of the cyclically shifted symbol as a new cyclic prefix.

Configuration of Common Feedback Channel

Figure 3A:
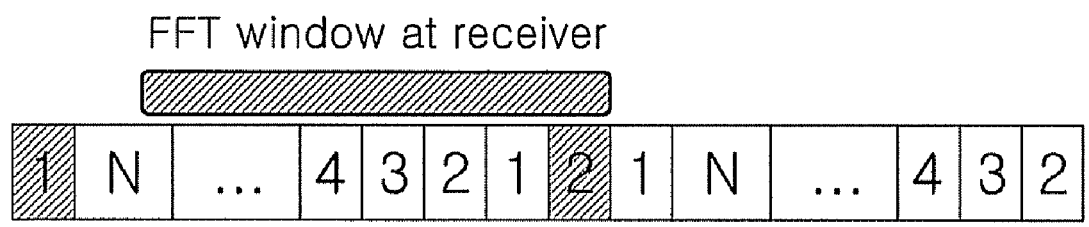
FIG. 3A is a diagram showing a case where the feedback signals in the common feedback channels are configured of two symbols.
Figure 3B:
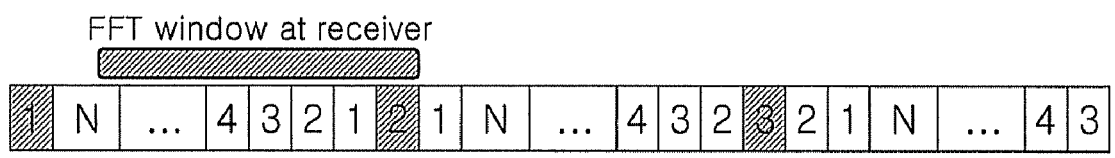
FIG. 3B is a diagram showing a case where the feedback signals in the common feedback channels are configured of three symbols.

FIG. 3A is a diagram showing a case where the feedback signals in the common feedback channels are configured of two symbols, and FIG. 3B is a diagram showing a case where the feedback signals in the common feedback channels are configured of three symbols. FIG. 3A shows a repeated pattern in which the first symbol and the second symbol are sequentially transmitted in the feedback channel, and FIG. 3B shows a repeated pattern in which the first symbol, the second symbol, and the third symbol are sequentially transmitted in the feedback channel. When the common feedback channel is configured of N−1 (N is a natural number of 2 or more) symbols, the feedback signals can be configured so that a pattern that the first symbol, . . . , the N−1-th symbol are sequentially transmitted is repeated, like the above-mentioned method.

When the symbols configured as shown in FIGS. 3A and 3B are transmitted through the feedback channels, even though signals with a time difference exceeding the length of the cyclic prefix are received, the corresponding symbol has a continuous pattern such that the inter-subcarrier orthogonality is maintained and the interference between adjacent symbols does not occur.

Figure 4:
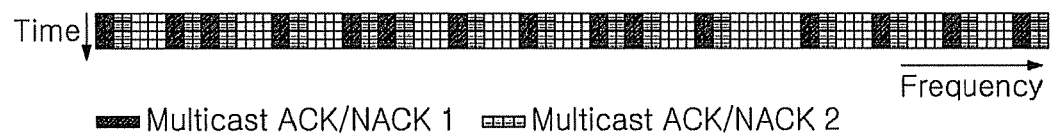
FIG. 4 is a diagram showing a configuration example of physical resources in the common feedback channels for transmitting feedback signal patterns according to an exemplary embodiment of the present invention.

FIG. 4 is a diagram showing a configuration example of physical resources in the common feedback channels for transmitting the feedback signal patterns according to an exemplary embodiment of the present invention.

The common feedback channel resources is configured of N_block basic blocks, and each basic block is configured of N_time symbols arranged on a time basis and N_freq subcarriers arranged on a frequency basis. FIG. 4 shows a case where the basic block configured of three symbols (N_time=3) and two subcarriers (N_req=2) is arranged in 15 numbers (N_block=15). Therefore, the common feedback channel occupies N_freq×N_block subcarriers in the OFDM symbol, and occupies the same subcarriers during N_time symbols to transmit the defined patterns.

The common feedback signal pattern according to an exemplary embodiment of the present invention is defined by Equation 1.

$$\text{Symbol 1: } P_1(i) = scr_m(i), (i = 1, 2, \ldots N_{freq}N_{block})$$

$$\text{Symbol 2: } P_2(i) = e^{j2\pi k_i(N_{cp}/N_{FFT})}scr_m(i)$$

$$(i = 1, 2, \ldots N_{freq}N_{block})$$

$$\ldots$$

$$\text{Symbol } m: P_l(i) = e^{j2\pi(l-1)k_i(N_{cp}/N_{FFT})}scr_m(i)$$

$$(i = 1, 2, \ldots N_{freq}N_{block})$$

$$\ldots$$

$$\text{Symbol } N_{time}: P_{N_{time}}(i) = e^{j2\pi(N_{time}-1)k_i(N_{cp}/N_{FFT})}scr_m(i)$$

$$(i = 1, 2, \ldots N_{freq}N_{block}).$$

[Equation 1]

Herein, i is an index of the subcarrier occupied by the physical resource of the feedback channel, $k_i$ is a frequency index of a substantial physical subcarrier occupied by the physical resource of the feedback channel, $N_{cp}$ is the number of samples of the cyclic prefix, and $N_{FFT}$ is a size of FFT. $scr_m(i)$ is a basic sequence value (or scrambling sequence value) to be transmitted to the i-th feedback subcarrier in the m-th cell, and satisfies the relation of $N_{time} < N_{FFT}/N_{CP}$. $P_l(i)$ means a value of a signal transmitted through the i-th feedback subcarrier of the I-th symbol.

Transmitter in Feedback Pattern

Figure 5:
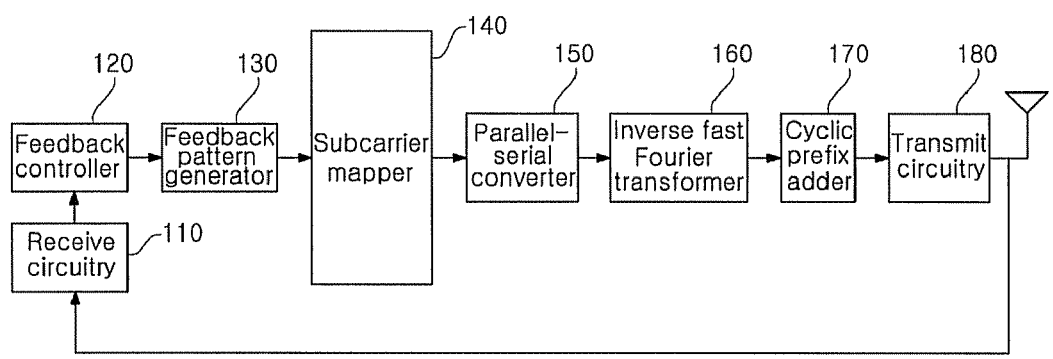
FIG. 5 is a block diagram schematically showing a configuration of a feedback channel transmitter according to an exemplary embodiment of the present invention.

FIG. 5 is a block diagram schematically showing a configuration of a feedback channel transmitter according to an exemplary embodiment of the present invention. A transmitter 100 according to the present exemplary embodiment includes receive circuitry 110, a feedback controller 120, a feedback pattern generator 130, a subcarrier mapper 140, a parallel-serial converter 150, an inverse fast Fourier transformer (IFFT) 160, a cyclic prefix adder 170, and transmit circuitry 180.

The receive circuitry 110 receives signals from the other party through an antenna, digitizes them, and then transmits them to the feedback controller 120.

The feedback controller 120 determines whether or not to perform feedback on the signals received from the other party. If so, the feedback controller 120 requests the generation of the feedback patterns to the feedback pattern generator 130. For example, as a result of decoding the signals received from the other party, if it is determined that the signals include errors that cannot be recovered, the feedback controller 120 requests the feedback pattern generator 130 to generate a feedback pattern of a NACK message. As another example, if it is determined that the channel state is degraded exceeding a predetermined reference while receiving the signals from the other party or a predetermined period is returned, the feedback controller 120 requests the feedback pattern generator 130 to generate the feedback pattern for the channel state information of the corresponding receive channel.

The feedback pattern generator 130 generates the feedback signal pattern through the above-mentioned cyclic shift. The feedback pattern generator 130 may generate the same feedback signal patterns for each cell, may generate the feedback signal patterns for each cell in a scheme of scrambling the feedback signal patterns with different scramble codes for each cell, and may generate the feedback signal patterns for each cell using Equation 1 at one time.

The subcarrier mapper 140 maps the feedback signal pattern to the subcarrier, but when there are data and/or control signals transmitted together with the feedback signal, it maps the data and/or control signals together with the feedback signal to the subcarrier.

The parallel-serial converter 150 makes the feedback signal mapped to the subcarrier a serial signal.

The inverse fast Fourier transformer (FFT) 160 transform signals in a frequency domain, which is mapped to the frequency subcarrier, into signals in a time domain.

The cyclic prefix adder 170 replicates the last predetermined length portion of the feedback signal, which is subjected to the inverse Fourier transform, to the front of the corresponding signal.

The transmit circuitry 180 performs intermediate frequency (IF) processing and radio frequency (RF) processing on the feedback signal to which the cyclic prefix is added, and transmits it through the antenna.

Transmitter in Feedback Pattern

Figure 6:
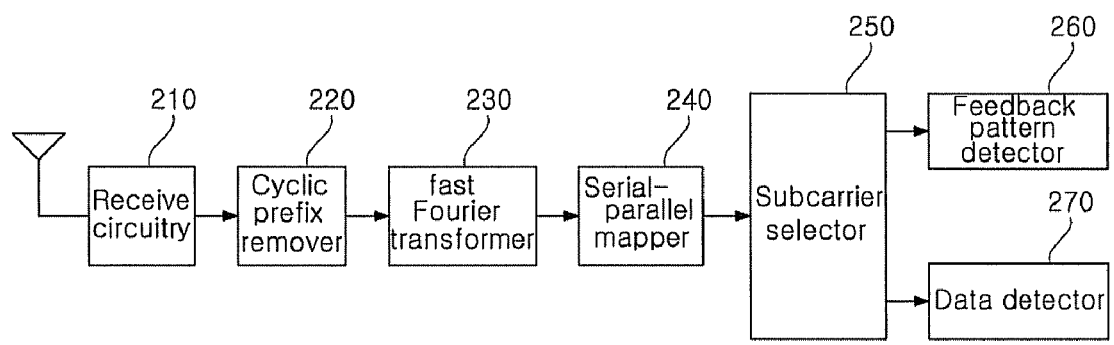
FIG. 6 is a block diagram schematically showing a configuration of a feedback channel receiver according to an exemplary embodiment of the present invention.

FIG. 6 is a block diagram schematically showing a configuration of a feedback channel receiver according to an exemplary embodiment of the present invention. A receiver 200 according to the present exemplary embodiment includes receive circuitry 210, a cyclic prefix remover 220, a fast Fourier transformer (FFT) 230, a serial-parallel converter 240, a subcarrier selector 250, a feedback pattern detector 260, and a data detector 270.

The receive circuitry 210 receives the feedback signals from the transmitter 100 through the antenna, performs the radio frequency (RF) procession and the intermediate frequency (IF) processing thereon to digitize them, and transmits them to the cyclic prefix remover 220.

The cyclic prefix remover 220 removes the cyclic prefix from the front of the received feedback signal, and transmits it the fast Fourier transformer (FFT) 230.

The fast Fourier transformer (FFT) 230 transforms the feedback signal, from which the cyclic prefix is removed, in a time domain into signals in a frequency domain, and the serial-parallel converter 240 makes parallelism the feedback signals converted into the frequency domain into the plurality of subcarriers.

The feedback pattern detector 260 extracts the feedback patterns from each subcarrier selected by a subcarrier selector 250, and the data detector 270 extracts the data and/or control signals from the corresponding subcarrier.

Receive Performance According to Patterning of Feedback Signal

Figure 7A:
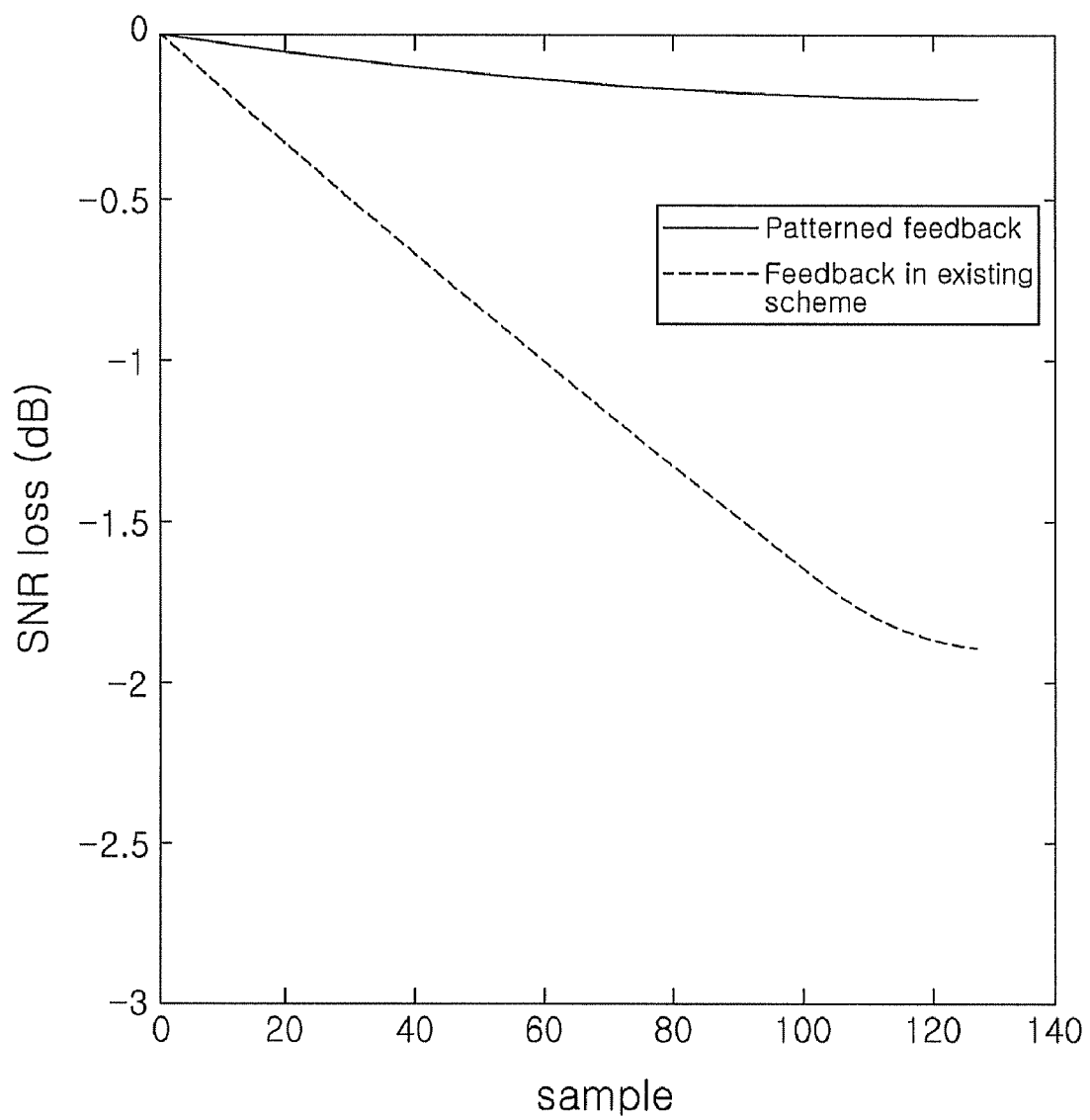
FIGS. 7A and 7B are graphs showing comparison results of experimental results for receiving performance of the feedback patterns according to an exemplary embodiment of the present invention and experimental results for the existing feedback scheme.
Figure 7B:
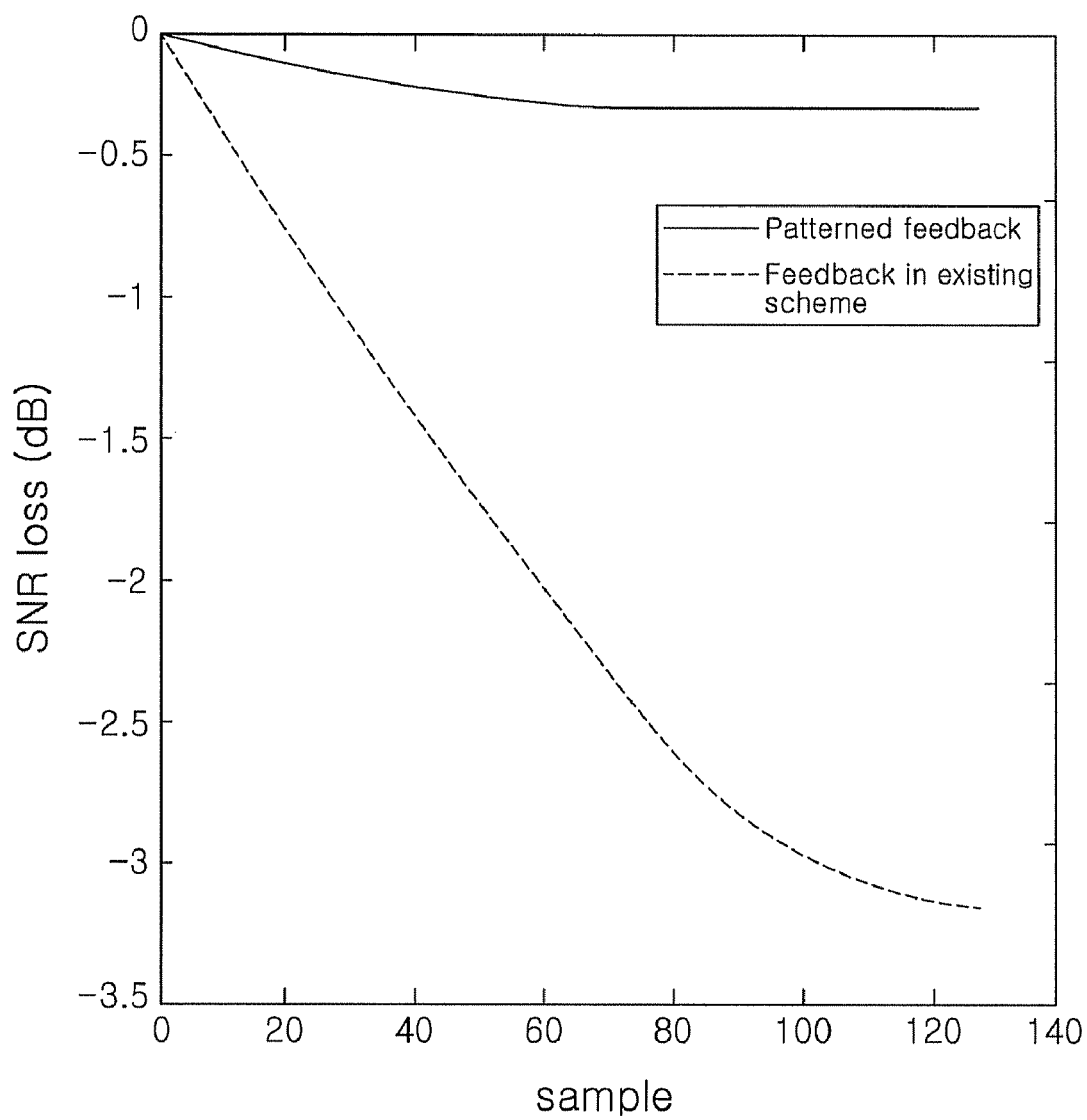

FIGS. 7A and 7B are graphs showing comparison results of experimental results for receiving performance of the feedback patterns according to an exemplary embodiment of the present invention and experimental results for the existing feedback scheme.

FIG. 7A is a diagram showing comparison results of a feedback pattern transmission scheme using three symbols and two subcarriers as a basic block and the loss rate of SNR at the receive end for the feedback transmission scheme in the related art, and FIG. 7B is a diagram showing comparison results of a feedback pattern transmission scheme using two symbols and four subcarriers as a basic block and the loss rate of SNR at the receive end for the feedback transmission scheme in the related art.

As can be confirmed from both FIGS. 7A and 7B, when the transmission is made in the feedback pattern, even though the receive time difference of the receive end according to the time delay is increased, it can be confirmed that there is little change in the loss rate of the SNR as compared to the feedback transmission scheme in the related art. Therefore, high QoS can be secured even in the signals fed back from the terminal that is in the idle mode.

The above-mentioned exemplary embodiments of the present invention are not embodied only by a method and/or apparatus. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting feedback signals by transmitters in a multiple access system, comprising:
   generating first transmission symbols by adding a cyclic prefix to a feedback signal;
   generating second and subsequent transmission symbols by further cyclically shifting the feedback signal and then adding a corresponding cyclic prefix; and
   transmitting the generated transmission symbols to common feedback channels of an uplink.

2. The method for transmitting feedback signals of claim 1, wherein the cyclic shift includes:
   dividing the feedback signal into a plurality of blocks having a predetermined length;
   shifting the feedback signal by one block in one direction; and
   moving last blocks of the shifted feedback signal to a front of a corresponding feedback signal.

3. The method for transmitting feedback signals of claim 2, wherein the length of the block is set to be same as the length of the cyclic prefix.

4. The method for transmitting feedback signals of claim 2, wherein the cyclic prefix is added in a scheme of copying the last block of the corresponding feedback signal to the front of the corresponding feedback signal.

5. A transmitter for transmitting feedback signals in a multiple access system, comprising:
   a feedback pattern generator that cyclically shifts a feedback signal to generate a feedback pattern;
   a cyclic prefix adder that adds a cyclic prefix to the generated feedback pattern; and
   transmit circuitry that transmits the feedback patterns to which the cyclic prefix is added to common feedback channels,
   wherein the feedback pattern generator generates the cyclic prefix to the feedback pattern to generate first transmission symbols, and further cyclically shifts the generated feedback patterns and then adds a corresponding cyclic prefix thereto to generate second and subsequent transmission symbols.

6. The transmitter for transmitting feedback signals of claim 5, wherein the feedback pattern generator
   divides the feedback pattern into a plurality of blocks having a predetermined length, shifts the feedback pattern by one block in one direction, and then moves a last blocks of the shifted feedback pattern to a front of a corresponding feedback pattern, thereby performing the cyclic shift.

7. A transmitter for transmitting feedback signals in a multiple access system, comprising:
   a feedback pattern generator that cyclically shifts a feedback signal to generate feedback pattern;
   a cyclic prefix adder that adds a cyclic prefix to the generated feedback pattern; and
   transmit circuitry that transmits the feedback patterns to which the cyclic prefix is added to common feedback channels, and
   a feedback controller that determines whether or not to perform feedback on signals received from another party, and if it is determined that the feedback is needed, it requests the generation of the feedback pattern to the feedback pattern generator.

8. A transmitter for transmitting feedback signals in a multiple access system, comprising:
   a feedback pattern generator that cyclically shifts a feedback signal to generate feedback pattern;
   a cyclic prefix adder that adds a cyclic prefix to the generated feedback pattern; and
   transmit circuitry that transmits the feedback patterns to which the cyclic prefix is added to common feedback channels, wherein the feedback pattern generator generates the same feedback signal patterns for each cell, and generates the feedback signal patterns for each cell in a scheme of scrambling the feedback signal patterns with different scramble codes for each cell.

9. A transmitter for transmitting feedback signals in a multiple access system, comprising:

a feedback pattern generator that cyclically shifts a feedback signal to generate feedback pattern;

a cyclic prefix adder that adds a cyclic prefix to the generated feedback pattern; and transmit circuitry that transmits the feedback patterns to which the cyclic prefix is added to common feedback channels, wherein the feedback pattern generator generates the feedback signal patterns for each cell at a time of using a previously prepared algorithm.

* * * * *